US006556222B1

(12) United States Patent
Narayanaswami

(10) Patent No.: US 6,556,222 B1
(45) Date of Patent: Apr. 29, 2003

(54) BEZEL BASED INPUT MECHANISM AND USER INTERFACE FOR A SMART WATCH

(75) Inventor: Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 09/607,594

(22) Filed: Jun. 30, 2000

(51) Int. Cl.[7] .............................. G09G 5/00; G04C 17/00
(52) U.S. Cl. ........................ 345/786; 345/701; 368/69; 368/295
(58) Field of Search .................... 345/786, 787, 345/828, 829, 830, 701, 700, 704, 810, 835, 839, 832, 853, 854, 964, 173, 174; 368/251, 244, 246, 248, 243, 10, 109, 247, 250, 262, 263, 267, 69, 295

(56) References Cited

U.S. PATENT DOCUMENTS 4,385,291 A * 5/1983 Piguet ........................ 345/173
6,414,907 B1 * 7/2002 Pennington ................. 368/10
6,443,614 B1 * 9/2002 Read ........................ 368/281

OTHER PUBLICATIONS

"The World's Smallest PDA Computer Watch", Hammacher Schlemmer Mid Summer 2000 Catalog, p. 3.

* cited by examiner

Primary Examiner—Kristine Kincaid
Assistant Examiner—Peng Ke
(74) Attorney, Agent, or Firm—Scully, Scott, Murphy & Presser; Gail H. Zarick, Esq.

(57) ABSTRACT

A wearable mobile computing device/appliance (e.g., a wrist watch) with a high resolution display that is capable of wirelessly accessing information from the network and a variety of other devices. The mobile computing device/appliance includes a user interface employing a bezel-based input mechanism including a bezel ring which may be rotated and depressed for generating both rotation and wheel click events for enabling navigation, selection and entry of various displayed textual and graphical items.

42 Claims, 5 Drawing Sheets

BEZEL BASED INPUT MECHANISM AND USER INTERFACE FOR A SMART WATCH

BACKGROUND OF THE INVENTION

1. Field of the Invention

This invention relates generally to mobile computing devices such as personal digital assistants (PDAs), cellular phones, pagers, and the like, and more specifically, to a wearable device/appliance (e.g., a wrist watch) capable of wirelessly accessing information and having an interactive user interface equipped with a bezel-based scroll mechanism for enabling navigation, selection and entry of text and graphics elements displayed via the user interface.

2. Discussion of the Prior Art

Computing, mobile and wireless communications technologies have been rapidly advancing—culminating in a variety of powerful user friendly devices such as personal digital assistants (PDAs), cellular phones, pagers, etc. Today, it is possible to purchase handheld PDA's, e.g., palmtops such as the Palm Pilot®, that employ wireless communication devices and that combines computing, telephone/fax, and networking features. A typical PDA may function as a cellular phone, fax sender, and personal organizer and are pen-based, requiring a stylus for text entry. As such, these device incorporate handwriting recognition features and may even employ voice recognition technologies that react to voice input. Small devices such as the RIM 950 and the Motorola PageWriter 2000 pager use a small keyboard for input.

Today, the industry is striving to provide advancements by providing increased PC desktop-like functionality while both decreasing size and power requirements. More recently there have been attempts to incorporate some of the capabilities of the above devices into wrist watches. However, today, only special wearable watch devices are available that, besides time keeping functions, may possess a compass, or a Global Positioning System (GPS), or barometer, heart rate monitor, Personal Handy System (PHS) phone, pager, etc. There are shortcomings in these existing special function watches in that most of them are bulky, are mostly unconnected the Internet or other PC/network devices, have limited battery life, and, are difficult to use. These currently available special function wrist watches additionally have user interfaces that are quite limited in what they can display. For example, in the context of setting time in digital watches, currently, the user is only enabled to set the hour and minute independently, with time only advancing in one direction. Furthermore, most of them have a 6 to 8 seven segment LED or LCDs which can be used to display 6 or 8 digits/letters, and have a small number of indicators that can display AM/PM, Alarm on/off, etc. only at fixed locations within the display. A few watches are currently appearing on the market that have slightly richer display characteristics. Regardless, these various shortcomings have to be solved, otherwise there is no compelling reason for these watches to become popular. The design of a wrist watch for mobile computing applications offers a significant challenge because the watch is a small device. That is, both fitting components and power supplies such as batteries into such a small volume and given the limited screen size of watches pose limitations that have be overcome. Solving these issues is worthy because the watch is an attractive form as 1) it is one of the few devices that a very large fraction of the population is already accustomed to worldwide, 2) is accessible almost all the time, and, 3) is hard to lose.

It would thus be highly desirable to provide a wearable device/appliance (a wrist watch) capable of wirelessly accessing information and equipped with an interactive user interface and high resolution display for providing a variety of desktop PC-like functions.

Current literature relating to human computer interaction has indicated that rotary dial and dial type mechanism are more popular on stereos, car radios, and electrical instruments than linear sliders, buttons, etc. Some mechanical type watches today are provided with a bezel mechanism which is a ring that fits on the periphery of the watch and supports continuous rotation to control various mechanical artifacts of the watchface display, e.g., provide various alarm-setting or time-keeping functions. U.S. Pat. No. Des. 409,924 discloses a watch bezel that have markings/text written on the bezel that may then be pointed to the hour or minute hand of the watch. The bezel is a convenient mechanism since it is continuously rotatable and allows fine positioning.

For instance, in a current bezel-based, alarm-setting feature exemplified by the Timex "Turn and Go" watch, the bezel is provided with two markers used to respectively set alarm time hour and minute positions. In such an application, the bezel is rotated with the markers rotatable for mechanically selecting an hour, e.g., via the first marker setting and, for setting the minute via the second marker setting. In such watches these bezel settings mechanically cooperate and interact with a button or switch which may be pulled and pushed to confirm setting of the alarm indicated by the bezel positions. In another example, bezels may be used to measure elapsed time or provide time remaining features. A further use of a bezel on a watch face is to provide it with markings corresponding to locations of cities around the world, so that, one may position the marking at a particular time setting and, implement a particular algorithm for enabling the determination of the current time in that city (or time zone) based on the current local time. Further applications of a bezel mechanisms include the provision of compass markings for indicating navigational directions, e.g., making a longitude/latitude adjustment.

However, it is the case that all these aforementioned bezel wrist watches are mechanical bezels and do not generate electrical signals that can be interpreted by a microprocessor.

It would thus be additionally highly desirable to provide a wearable electronic device/appliance (a wrist watch) equipped with an interactive user interface and high resolution display for providing a variety of desktop PC-like functions and further implementing a bezel control mechanism for enabling navigation, selection and entry of text and graphics displayed via the user interface.

SUMMARY OF THE INVENTION

It is an object of the present invention to provide a wearable device/appliance (a wrist watch) capable of wirelessly accessing information and equipped with an interactive user interface and high resolution display for providing a variety of desktop PC-like functions.

It is a further object of the present invention to provide a wearable device/appliance (a wrist watch) having an interactive user interface equipped with a bezel control device for enabling navigation through and selection of text and graphics elements displayed via the user interface.

In a preferred embodiment, as will be described in greater detail herein, the roller device comprises a bezel which may be rotated and depressed for generating both rotation and wheel click events for enabling the navigation, selection and entry of text and graphic display items.

According to the invention, there is provided a system and method for controlling user interface functions in a wearable appliance including a high-resolution display for displaying text and graphic items and a bezel-based input device having a bezel ring capable of being rotated and activated for executing user interface functions, said method comprising the steps of: generating display of the user interface functions via the display and initiating display of a cursor navigation element thereof; generating signals in response to rotation of the bezel ring for navigating the cursor through displayed graphic and text items; generating a signal in response to activation of the bezel-based input mechanism for selecting a displayed graphic and text item highlighted by the cursor; and, receiving the signals and effecting navigation, selection and entry of displayed items through the user interface.

BRIEF DESCRIPTION OF THE DRAWINGS

Further features, aspects and advantages of the apparatus and methods of the present invention will become better understood with regard to the following description, appended claims, and accompanying drawings where:

DETAILED DESCRIPTION OF THE PREFERRED EMBODIMENTS

Figure 1:
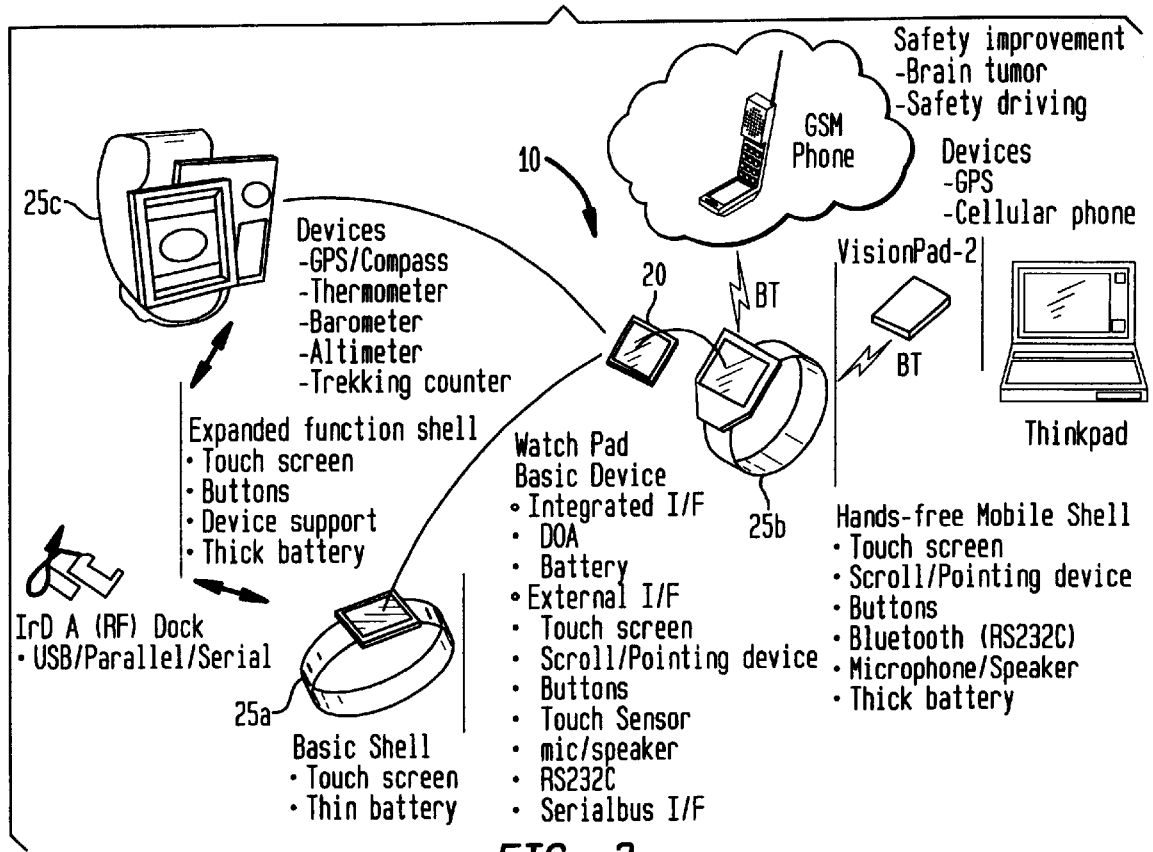
FIG. 1 illustrates conceptually the wearable information access wrist watch device of the invention.

FIG. 1 illustrates conceptually the wearable information access wrist watch device of the invention. Referred to herein as the "Wrist Watch" 10, the system looks like a regular watch but is capable of receiving information from adjunct devices such as a PC, a mobile computer, other pervasive devices being carried by the user and directly from a network via a wireless communications mechanism.

As shown in FIG. 1, the Wrist Watch device 10 is based on a modular concept designed to include a motherboard or base card 20 of minimum card size that leverages state-of-the-art technologies as will be described in greater detail herein. Specifically, the base card 20 may be implemented in various types of shells 25a, ..., 25c for enabling various functions. For example, the base card 20 may be implemented in a basic shell 25a providing desk-top like functionality via a touch screen display; a hands-free mobile shell 25b providing, in addition to basic desktop functionality, a communications interface with GPS and mobile phone communications capability etc., and including a touch screen display, scroll/pointing devices, and microphone and speaker devices; and an expanded function shell 25c, providing touch screen, buttons and support for various devices such as GPS/compass, thermometer, barometer, altimeter, etc.

Figure 2:
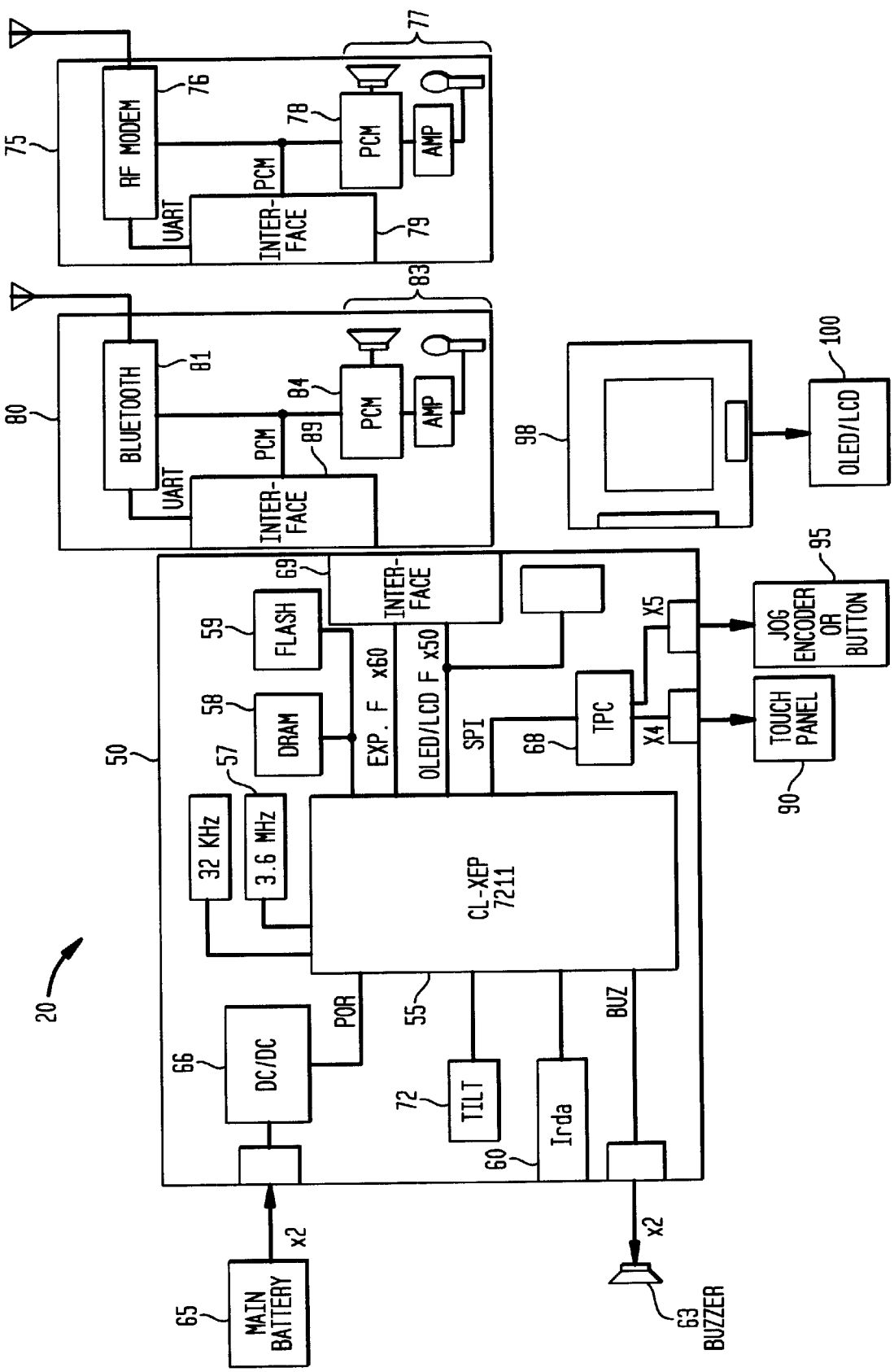
FIG. 2 is a detailed block diagram illustrating the hardware architecture of the Wrist Watch device 10 implementing the bezel-based input mechanism of the present invention.

FIG. 2 is a detailed block diagram illustrating the hardware architecture of the Wrist Watch device 10. As shown in FIG. 2, the base card 20 includes a first or main card 50 housing the core processing unit, I/O, and memory. For example the main card 50 includes a CPU 55, such as a Cirrus Logic CL-EP7211, which is a single-chip embedded controller functioning as a CPU for ultra-low-power applications, and armed with processing and enhanced memory management features to function equivalently as a 100 MHz Pentium. The core processing unit may operate at 2.5 V, and, to minimize the board size, may be equipped with a 3.68 MHz ceramic resonator 57 for generating the main frequency clock and timing signals. The main card 50 additionally includes sufficient nonvolatile and volatile memory including, for example, 64 Mbit EDO DRAM 58 and SRAM/Flash memory 59 that supports the system code. One communications subsystem of the Wrist Watch 10 includes a line of sight Infrared Data Association (IrDA) communications interface having a low-power IR transceiver module 60 mounted on the card 50 for direct connection with interface decoder pins of the CPU 55 which includes an IrDA SIR protocol encoder. The first card 50 additionally includes various Analog to Digital converters (ADC), memory refresh logic and industry standard interfaces such as a compact flash interface for example, so that other devices could be attached to the Wrist Watch 10. Other interfaces such as Universal Serial Bus (USB), and I2C, etc. may additionally be incorporated. FIG. 2 further illustrates the main card 50 as comprising power supply subsystem including a rechargeable Li-Polymer type battery 65 and a DC to DC converter 66 for supporting a wide dynamic range of Wrist Watch system/sub-system load.

With further reference to FIG. 2, the main card 50 has no audio capability but is equipped with a PCM audio interface in expansion tabs (not shown) for an accessory card, i.e., either card 75 or 80, in the expanded-shell Wrist Watch designs that support PCM audio. Particularly, the accessory card 75, 80 implemented includes a speaker and a microphone combination 77, 83 respectively, with the microphone functioning to record voice input which may be processed by the processor subsystem or stored in a storage subsystem for subsequent playback, and the speaker functioning to provide voice output, produce customized tones, and enable acoustic coupling with other listening devices, etc. As shown in FIG. 2, each speaker/microphone combination 77, 83 is connected to a respective pulse-coded modulation PCM coder/encoder devices (CODECs) 78, 84 which are controlled by a respective PCM interface 79, 89 to the CPU 55. The accessory card 75, 80 is additionally equipped with various communications subsystems including low power and intermediary power radio frequency communications devices that support a Wireless Application Protocol ("WAP") used to provide communications links to mobile computers, mobile phones, portable handheld devices and, connectivity to the Internet. In one embodiment, the specific communications subsystems include circuitry for supporting BlueTooth 81 or like small-factor, low-cost radio solution circuitry, e.g., an RF-modem 76, and may include other low power radio and Flex-paging communications circuits (not shown), etc. For instance, as shown in FIG. 2, the auxiliary communication card 80 implements the BlueTooth industry standard for Radio Frequency (RF) communication, however, it is understood that other standards such as IEEE 802.11 or other RF protocols may be implemented as well. Moreover, portions of these communication protocols may be implemented on the processor on the main board 50 so that the total number of the components required is minimized. The CPU system on the main card 50 preferably employs a first Universal Asynchronous Receiver Transmitter (UART1) device (not shown) for supporting either the RF-modem 76 or Bluetooth 81 communications functionality and, may be equipped with a second UART device (UART2) providing support for data download functionality, e.g., from a PC or network server. It is understood that any like data transfer mechanism or data exchange interface device may be implemented to provide data download and RF communications support functionality.

For purposes of interacting with the device, the Wrist Watch system 10 is provided with a touch sensitive screen/panel 90 shaped within a standard watch form factor, and also a roller wheel mechanism, i.e., jog encoder 95. The touch sensitive screen enables the direct launching of applications by physical user entry of a graffiti "squiggle" in the manner such as described in commonly-owned co-pending U.S. patent application Ser. No. 09/607,596 entitled GRAFFITI BASED APPLICATION LAUNCH ON A SMART WATCH, the whole contents and disclosure of which is incorporated by reference as if fully set forth herein, and may initiate other applications/actions/events by physical touching of certain Wrist Watch display areas. In one embodiment, the touch sensitive screen panel is provided with a four (4) position touch screen. For instance, forward and back navigation for Wrist Watch displays is enabled by physically touching certain areas of the touch sensitive panel. The roller wheel mechanism 95 may be rolled up or down (i.e., clockwise or anticlockwise) to simulate a display cursor scrolling function for text and graphics. In the context of the present invention, the roller wheel mechanism 95 generates signals that are A/D converted for receipt by the processor to enable movement of the Wrist Watch display cursor, and more particularly, movement of an arrow cursor or other displayed indicators providing appointment update and browsing functions. Preferably, when the wheel mechanism moves by more than a predetermined amount, e.g., 20° degrees, the wheel generates a signal as a mouse device would when rolled. If a user rolls the wheel continuously, the wheel generates a signal for every 20 degrees of rotation (hereinafter "rotation event(s)"), with the event generated including an indication specifying whether the wheel was turned clockwise or anticlockwise. In this manner, the direction of the roller wheel, and consequently, the direction of cursor movement through a particular display, is tracked by the processor. The roller wheel mechanism additionally may be pushed or depressed to generate a signal (hereinafter "wheel click event(s)"), akin to a keypress or mouse click event, for activating a selected application, hyperlink or a menu item. In a preferred embodiment, as will be described in greater detail herein, the roller wheel device comprises a bezel which may be rotated and depressed for generating both rotation and wheel click events.

As further shown in FIG. 2, various Analog to Digital converters (ADC) 68 support an interface with the touch screen display panel 90, and an interface with the jog encoder or button for the roller wheel mechanism 95. An interface 69 is provided for a unit 98 housing a high resolution (VGA equivalent) emissive Organic Light Emitting Diode (OLED) high contrast display 100. Further, the main card 50 for the basic shell interfaces to a buzzer 63 controlled directly by the CPU 55 using its buzzer interface and timer counters. To detect the posture of the watch, a mechanical four-way tilt sensor 72 is further provided comprising mechanical switches (for detecting degree of tilt) producing signals which may be detected by the CPU. This sensor may be used for the various purposes such as power management, display control, etc. In a preferred embodiment, additional sensors may be attached to the Wrist Watch device over an interface. Examples may include additional tilt and motion (velocity, direction, speed) sensors, environment sensors such as thermal sensors, pressure sensors, health monitoring sensors such as blood pressure, etc. The Wrist Watch accordingly provides the display for the sensor and may also analyze the data collected from the sensors.

With more particularity, the high contrast display 100 of FIG. 2 does not need a backlight to make the display visible. Thus, the power consumed by the display is proportional to the number of pixels that are turned on in the display. Since the pixels preferably comprise light emitting diodes, the display is automatically visible at night and a user does not need to press any buttons to see the display. Moreover, the OLED display 100 may be viewed clearly at a wide variety of angles with the brightness of these displays being controlled by limiting the amount of current supplied to the diodes. In one embodiment, the OLED chip 100 is a high-resolution pixel addressable display, e.g., 640×480, for enabling the display of various textual and graphical items on the watch face, similar to what may be displayed on a computer screen or a Palm Pilot®. For example, the time may be represented by drawing the hour and minute hands on a watchface display. Further, the hands of the watchface display may be erased when, at some other time, a display of a photograph is desired to be displayed.

Figure 3:
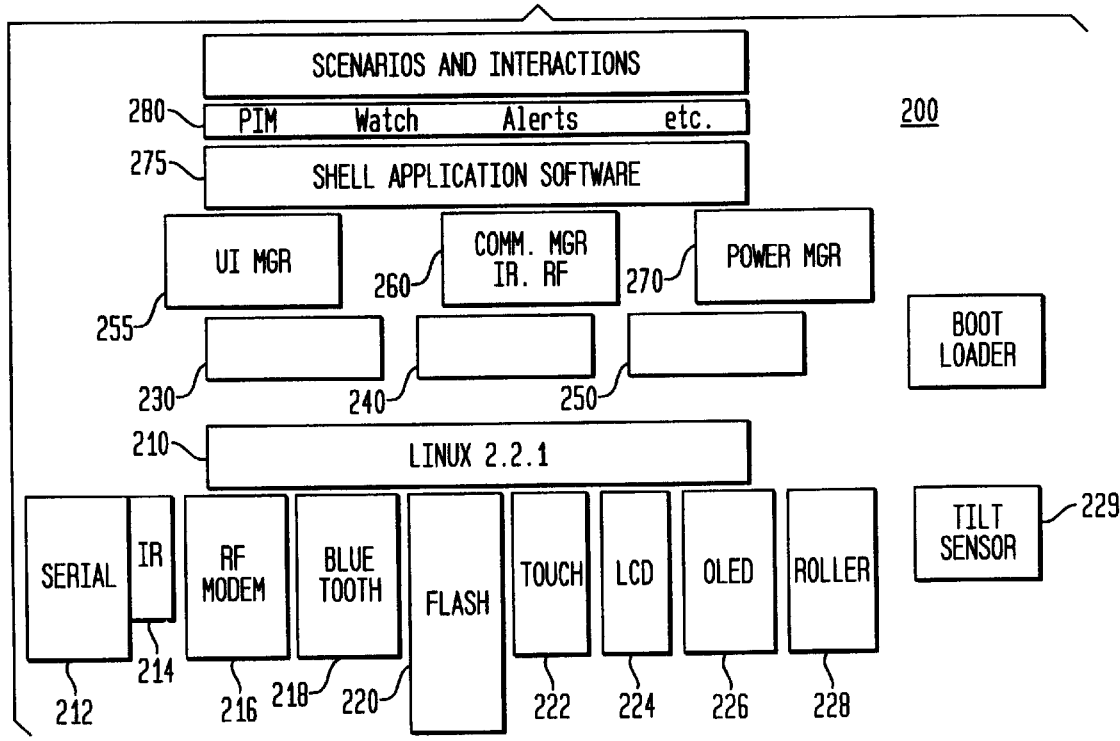
FIG. 3 illustrates the software architecture 200 for the Wrist Watch device 10.

FIG. 3 illustrates the software architecture 200 for the Wrist Watch device 10. At its lowest level, the Wrist Watch device runs an operating system 210, e.g., LINUX 2.2.1, that permits multiple user level and kernel level threads to run and will support multitasking and multi-user support. Device drivers are provided for each input/output subsystem will handle low level device dependent code and interfaces so that higher level Application Programming Interfaces (APIs) can be implemented on top of them. The device drivers provided for each input/output subsystem include a serial I/O system driver 212, IrDA system driver 214, RF-Modem subsystem driver 216, Bluetooth system driver 218, flash memory 220, touch screen subsystem driver 222, LCD subsystem driver 224, OLED subsystem driver 226, roller wheel or bezel subsystem driver 228 and tilt sensor device driver 229. A client-server graphics subsystem 230, storage subsystem manager 240 and synchronization subsystem manager 250 is provided on top of the device drivers for receiving and transmitting I/O events between the applications, updating of the screen, etc. A graphics library is available for the application writer so that custom screens may be displayed. A user interface manager 255 is provided to process events received from user input devices such as the bezel (jog encoder) and touch panel for the appropriate applications. A communication subsystem manager 260 is provided to handle events from communication channels and pass the events to the right application to set things up for data transfers to proceed. The synchronization manager 250 is provided to synchronize data between the Wrist Watch and the other devices. Particularly, it receives the data from the communication channel and operates in conjunction with the right application to decode the sent data and update the data for the application receiving the data. An example of this would began update to a calendar event. A system wide power manager 270 is provided to monitor and control power consumption on the device and communicate with other subsystems such as the operating system scheduler to optimize the battery life of the device. The power manager 270, for example, measures the power left in the battery, estimates the power required to run an application, and recommends what subsystems need to be shut down as the battery starts draining out.

Figure 4:
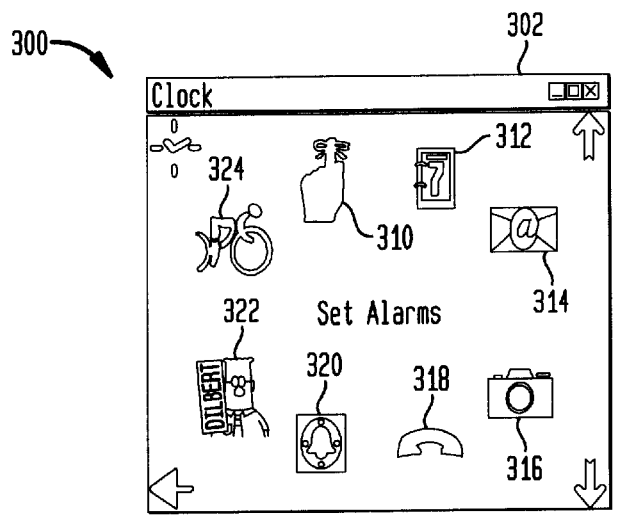
FIG. 4 illustrates an example Wrist Watch system display 300 providing a main menu of selectable icons for launching Personal Information Management applications provided in the Wrist Watch device.

As further shown in FIG. 3, the Wrist Watch device 10 is equipped with Wrist Watch shell application software 275 provided on top of the basic graphics, communication and synchronization subsystems. One key application supported is the microbrowser which enables access to a WAP-supporting Web site and receives Web-based communications written in, for example, the Wireless Markup Language ("WML") using the XML standard. WML particularly is designed to optimize Internet text data for delivery over limited-bandwidth wireless networks and onto small device screens, and particularly, is devised to support navigation with limited input mechanisms, e.g., buttons. Details regarding the implementation of WML in the Wrist Watch device may be found in commonly-owned, co-pending U.S. patent application Ser. No. 09/608,042 entitled SYSTEM AND METHOD EMPLOYING WML ANNOTATIONS FOR USER INTERFACE CONTROL OF A WEARABLE APPLIANCE the contents and disclosure of which is incorporated by reference as if fully set forth herein. Other supported applications include Personal Information Management (PIM) applications software 280. FIG. 4 illustrates an example system display 300 providing a main menu 302 comprising selectable icons for launching the following PIM applications: an icon 310 for launching an application directed to displaying/maintaining "to do" lists, an icon 312 for launching an application directed to displaying/maintaining calendars and appointments, an icon 314 for launching an application directed to retrieving/storing/displaying e-mail messages, an icon 316 for launching an application directed to retrieving/storing/displaying digital photographs and bit-mapped images, an icon 318 for launching an application directed to retrieving/storing/displaying phone lists, an icon 320 for launching an application directed to setting of time and alarms which is shown highlighted and indicated by the displayed text "SET ALARMS", an icon 322 for launching an application directed to retrieving/storing/displaying comic images such as Dilbert© United Feature Syndicate, Inc., and, an icon 324 for launching an application directed to providing stop watch and elapsed time features. Other applications may include those enabling the receipt of excerpts of personalized data, such as traffic information, weather reports, school closings, stock reports, sports scores, etc., from the world wide web. These excerpts may be received as notifications or alarms on the Wrist Watch 10. Inter-device interaction software applications are included to permit the watch display to become the display for another device such as a GPS located in a concealed location, (e.g., a bag), or a thermostat on the wall, etc. Thus, this application software enables communication between the other device and the Wrist Watch by receiving/displaying the data and transmitting back information sent from the Wrist Watch. As a further example, caller Id information may be displayed on the Wrist Watch display when the cell phone that belongs to that person rings. Typically, multiple persons are congregated in a room and carry their cell phones in a hand bag or wear them on their belts, have a hard time determining which cell phone is ringing when a ringing tone is heard in a room. This results in every person in the room pulling out his/her cell phone out of their handbag or belt to check if it is the one that is ringing. The caller Id display feature of the Wrist Watch device is particularly advantageous as each wearer may simply glance at the watch and would immediately know if the ringing phone belonged to him/her, in addition, to determining who the calling party is facilitating the decision of whether or not he/she should answer the phone. In a further example, this application software may allow the data from the Wrist Watch storage subsystem 240 to be viewed on another device such as on a PDA, PC, and other community viewing devices. In the preferred embodiment, middleware such as Tcl/Tk, Javascript, Perl, or the like etc., may run on top of the operating system, graphics and communication manager APIs for facilitating rapid development of these applications on the Wrist Watch device 10.

Figure 6A:
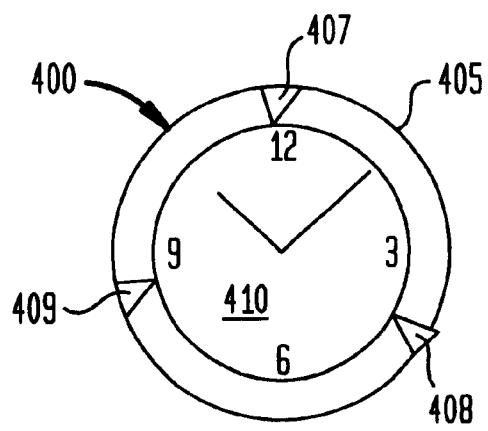
FIGS. 6(a) and 6(b) illustrate respective front view and side views of the electronic Wrist Watch device implementing a bezel control mechanism.

As mentioned, the present invention is directed to the use of a bezel control device on the electronic Wrist watch. As shown in FIG. 6(a), the bezel 400 comprises a ring 405 that fits on the periphery of the watch 410 and supports continuous rotation. The bezel 400 is a convenient mechanism as it is continuously rotatable and allows fine positioning. Rotation of the bezel generates electrical signals that are processed by an A/D converter and sent to the CPU for further processing (FIG. 2). These signals are used to measure how much the bezel has rotated and, further, in what direction (hereinafter "rotation event"). The rate at which the bezel is rotated may also be determined. As shown in the side view of the watch in FIG. 6(b), the bezel 400 is mounted on top of an annular plate 420 via a flexible annular support ring 425 for permitting rotation and, an intermediary of springs 430 for enabling the bezel to be pressed down in the direction of the wrist. Such a downward movement generates another electrical signal (hereinafter "wheel click event") that may be transmitted to the CPU to indicate a selection, e.g. of text or graphics on the Wrist Watch display, or activation of an event or application. It is understood that such a downward movement must be imparted on all of the springs in order to avoid the generation of false click events for example, when one spring is depressed. The springs 430 may be either mechanical or gas or liquid filled pistons and have sufficient stiffness so that the bezel does not get pressed down during normal rotation. In an alternate embodiment, the annular plate 420 itself may be pulled up in the direction indicated by arrow "A" to provide a click event, e.g., an icon selection. In this manner, undue pressure and friction on the springs 430 may be avoided when rotating the bezel. As further shown in FIG. 6(a), the bezel may have several physical markings or icons 407–409 on it so that special significance may be assigned when these icons are aligned along a specific angular position, for example, the 12 o'clock position or the 6 o'clock position.

Figure 6B:
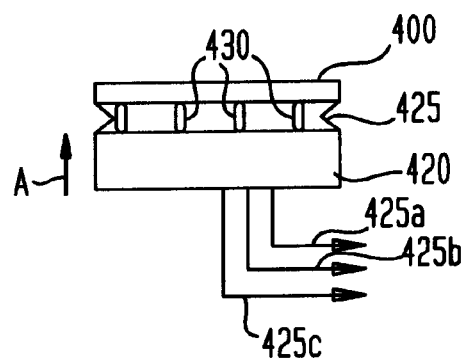

In the preferred embodiment, the bezel mechanism may be manipulated either clockwise or anti-clockwise to interact with a displayed cursor or other electronic selector, by continuously generating rotation events (electronic signals) which are interpreted by the CPU for controlling and navigating movement of a cursor within an all pixel-addressable Wrist Watch device display, for example, to move a cursor from one icon to a previous or next icon (such as a displayed application shortcut icon shown in FIG. 4), to move from one item of text to another and vice-versa, and to scroll from one region of the display to another. For example, the bezel may be used to scroll through a long page of text that does not fit within the Wrist Watch display area. Further, when the cursor is positioned at the desired location or selection on the display, the bezel may be activated (i.e., depressed) to generate a wheel click event, i.e., electronic signal, for selecting a cursor highlighted icon, for example, to initiate launching of a PIM application, set an alarm time, provide user calendar/appointment browsing functions, or change the display from providing the user's calendar to the user's spouse's calendar to the user's children's calendar, etc. for example. In another embodiment, the bezel may be equipped with a "time out" mechanism for automatically initiating selection of a highlighted icon after the bezel has moved a cursor to highlight a displayed icon, for example, and after the bezel movement, by subsequent inaction for a predetermined period, e.g., 5 seconds. FIG. 6(b) illustrates the signals 425a–425c generated by the bezel device associated with rotation, direction, and activation of the bezel device for receipt by the A/D converters and CPU for display navigation, application selection/launch and display cursor control.

Figure 5A:
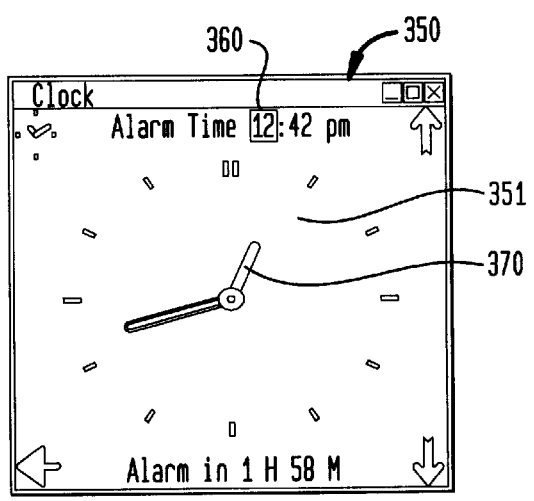
FIGS. 5(a) and 5(b) illustrate example Wrist Watch device displays 350 provided for performing hour-hand and minute-hand alarm setting functions as set via the bezel control mechanism.
Figure 5B:
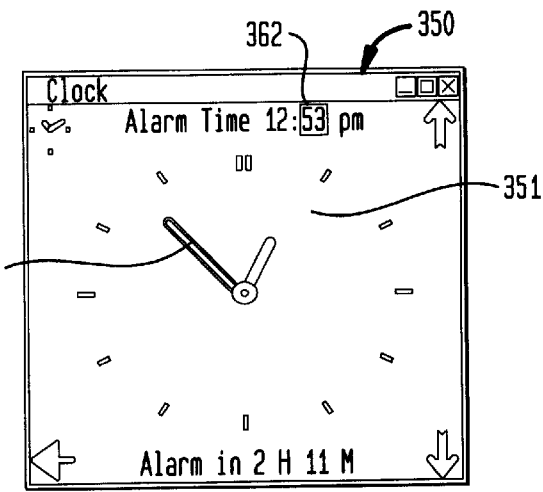

In another application, one task that the user may need to perform on the watch is to set the hour and minute hands to a particular value; for example, to set an alarm for a particular time. FIGS. 5(a) and 5(b) illustrates a Wrist Watch user interface 350 providing an alarm setting feature as described in detail in commonly-owned, co-pending U.S. patent application Ser. No. 09/608,043 entitled ALARM INTERFACE FOR SMART WATCH, the whole contents and disclosure of which is incorporated by reference as if fully set forth herein. As shown in FIGS. 5(a) and 5(b), there is provided the Wrist Watch device display 350 comprising a watch face 351 having indicators 360, 362 corresponding to hour hand 370 and minute hand 372, respectively, for setting an alarm notification time in hours and minutes via control of the bezel-based input mechanism according to the invention. In accordance with the disclosure of commonly-owned, co-pending U.S. patent application Ser. No. 09/607,801 entitled METHOD AND APPARATUS FOR DYNAMICALLY CONTROLLING SCROLLER SPEED EMPLOYED FOR A USER INTERFACE OF A WEARABLE APPLIANCE, the whole contents and disclosure of which is incorporated by reference as if fully set forth herein, a dynamic speed control mechanism may be implemented for enabling fine and coarse-grain setting of alarm setting times, for example, via the bezel based input mechanism.

Figure 8A:
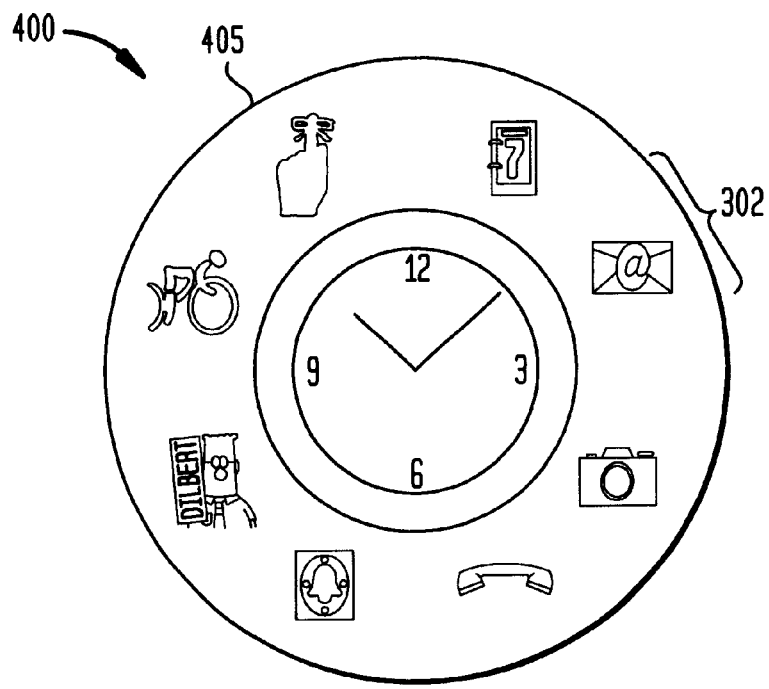
FIG. 8(a) illustrates the bezel-based input mechanism including a menu of selectable icons for launching Personal Information Management applications provided in the Wrist Watch device.
Figure 8B:
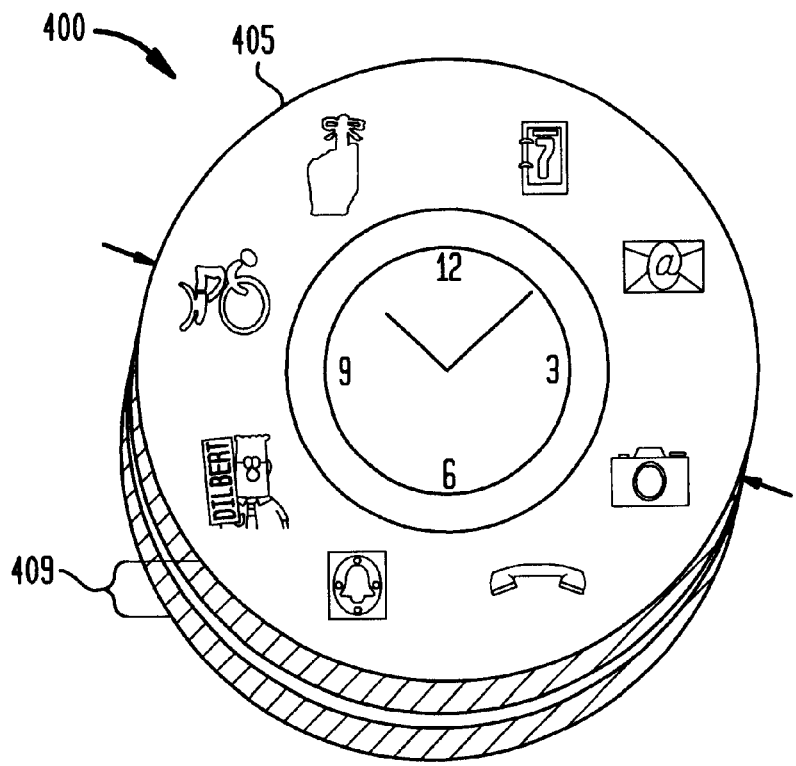
FIG. 8(b) illustrates the bezel-based input mechanism of FIG. 8(a) including a squeezable gasket for initiating an icon selection.

In another embodiment as mentioned above, and as illustrated in FIG. 8(a), the ring 405 of the bezel input device 400 may itself may be provided with fixed icon markers representing applications, such as the applications disclosed in the menu ring 302 depicted of FIG. 4. These specific applications may be launched by aligning the bezel icon to a fixed hour and then pressing the bezel down for activation, rather than cursor selection from the high resolution graphics display. As an example application, the bezel mechanism may be used to set an alarm at a particular time by aligning an alarm application icon on the bezel with the time at which the alarm needs to be sounded, and then activating the bezel selection mechanism. In the manner described in above-mentioned, co-pending U.S. patent application Ser. No. 09/608,043 a relative alarm may additionally be set, e.g., ring the alarm in 35 minutes from the current time. This may be done by matching another icon on the bezel with the desired hour hand position and activating the bezel selection mechanism. In an alternate embodiment, the bezel ring 405 itself may comprise a pixel addressable display with the Wrist Watch generating a ring of application icons that will change depending upon a particular application presented on the Wrist Watch device display. Thus, when a user application such as "Set Alarms" is selected via the display, the bezel ring 405 display may present other icons including, set absolute alarm, set relative alarm, set quiet time interval etc. for user selection. In still an alternate embodiment depicted in FIG. 8(b), the bezel input mechanism 400 may be provided with a squeezable gasket 409 surrounding the bezel plate which may be squeezed or pressed at the location of a fixed icon marker to launch a particular application whether the icon is displayed via the device display or via the bezel ring itself.

Figure 7:
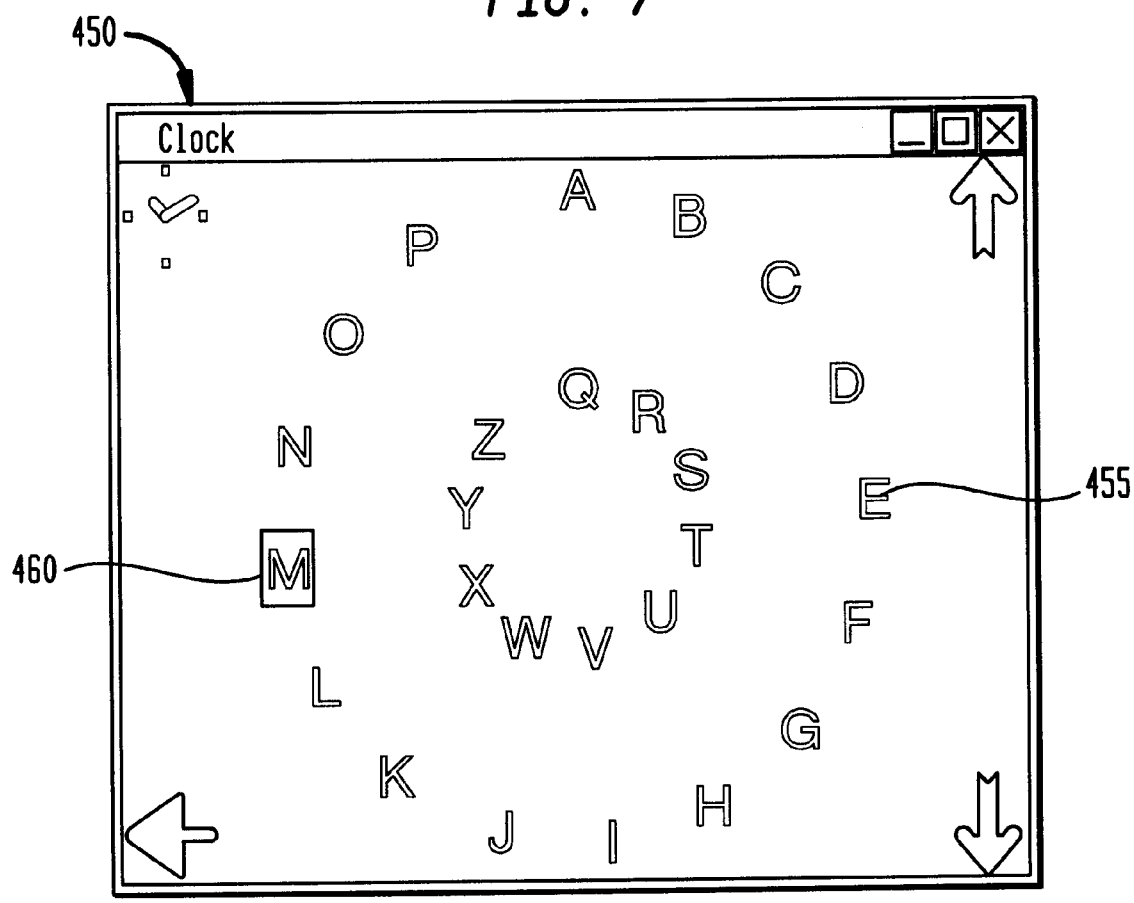
FIG. 7 illustrates an example Wrist Watch system display 450 providing the alphabets in a circular ring for selection by the bezel control mechanism.

Additional examples for the use of the bezel-based input mechanism include:

1) text/character input mode—for example a number "1" may be entered by positioning a distinct marking or spot on the bezel at a pre-defined position and than activating the bezel selection mechanism. Similarly, any digit between "0" and "9" may be entered. Preferably, the Wrist Watch system is provided with a mode control setting for enabling bezel-based input entry of various letters or characters. Thus, for example, as illustrated in FIG. 7, a Wrist Watch device display 450 may be generated to provide all of the letters in the alphabet in a circular ring 455 or, on a rectangular grid, for example. Preferably, the bezel input device is rotated to highlight 460 the desired letter to be entered and the bezel selection mechanism activated to enter the desired highlighted character or letter. The system is then put into a mode for receiving the next letter to be input. Such a mechanism is valuable for entering a name and phone number, for example, in the PIM address or appointment book application.

2) text/information retrieval mode—in the PIM address or appointment book application, for example, a mode may be entered whereby the bezel based control mechanism described may be used to enter the alphabet to look up phone numbers. For example, when the letter is selected, previously entered and stored names beginning with that letter may be displayed on the high resolution screen display 450. Still, in another mode, positioning a fixed marker on the bezel at a predefined hour position and initiating the bezel selector mechanism may initiate display of all the appointments for that hour in detail. A user may thus easily turn the bezel and determine the appointments for a subsequent hourly interval. This text/information retrieval mode may be extended additionally to include the concept of months since there are 12 months in a year which correspond to the 12 hour positions on the watch.

3) zoom mode—the bezel may be set in a zoom mode, for example, by scrolling to a zoom mode selector icon (not shown) and selecting it. While in the zoom mode, further rotation of the bezel in one direction will increase the size of the characters being displayed, while rotating the bezel in the other direction will decrease the size of the characters being displayed. Subsequent activation of the bezel selection mechanism in this mode will exit the bezel out of the zoom mode and back into a normal mode of operation.

4) password protection mode—the bezel may be used in an application for enabling secure access to data stored in the Wrist Watch device, for example, as described in detail in commonly-owned, co-pending U.S. patent application Ser. No. 09/608,110 entitled PASSWORD PROTECTION USING SPATIAL AND TEMPORAL VARIATION IN A HIGH-RESOLUTION TOUCH SENSITIVE DISPLAY, the whole contents and disclosure of which is incorporated by reference as if fully set forth herein.

5) safe—the bezel may be used in an application for enabling secure access to data stored in the Wrist Watch device in a manner similar to the "Master" lock safe concept where a knob has to be turned clockwise to a particular location, then counterclockwise to a particular location and finally clockwise to yet another location. In this embodiment, the bezel may be turned like a "Master" lock knob in order to gain access to the "safe" contents stored in the watch memory.

6) Analog controls for other devices—the bezel, coupled with the wireless link, may be used to control operation of other devices. An example would be to scroll through an on-screen TV guide using the bezel, or to change channels. Another example would be to remotely control the brightness of lights, temperature settings on thermostats, volume control on a music device, etc.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A wearable appliance implementing a user interface, said wearable appliance comprising:
    a high-resolution pixel-addressable display for displaying text and graphic items, at least one item including a cursor element;
    a bezel-based input mechanism comprising a bezel ring capable of being manipulated for generating signals representing bezel rotation events corresponding to user manipulation of said bezel ring for navigating said cursor element through said display, and wheel click events corresponding to user activation of a displayed item highlighted by said cursor; and,
    a control device for receiving said signals and enabling navigation, selection and entry of displayed items through said user interface.

2. The wearable appliance as claimed in claim 1, wherein said signals representing rotation events further enables scrolling through regions of said display.

3. The wearable appliance as claimed in claim 1, wherein said signals representing rotation events further enables scrolling through a long page of displayed text that does not fit within an interface display area.

4. The wearable appliance as claimed in claim 1, wherein said generated signals representing rotation events further includes a signal representing direction of said bezel rotation.

5. The wearable appliance as claimed in claim 1, wherein a displayed item includes a graphic icon representing an application capable of being executed in said appliance.

6. The wearable appliance as claimed in claim 5, wherein said said bezel ring includes: one or more fixed icons corresponding to applications capable of being executed in said appliance, said bezel ring manipulated for aligning a fixed icon with a predetermined position and activating said aligned fixed icon of said selected application.

7. The wearable appliance as claimed in claim 5, wherein said bezel ring includes: a display mechanism for presenting one or more graphic icons corresponding to applications capable of being executed in said appliance, said control device initiating display of said one or more graphic icons in said bezel ring display according to an application selected in said user interface display.

8. The wearable appliance as claimed in claim 5, wherein said control device includes mechanism for placing said appliance in a text/character entry mode, said mechanism enabling display of text and characters to be entered, whereby said bezel-based input mechanism is manipulated to highlight a desired text/character and activated to enter the desired highlighted text/character.

9. The wearable appliance as claimed in claim 8, wherein said text/character entry mode mechanism automatically places said appliance in a mode for receiving a next text/character to be input after a first character is entered.

10. The wearable appliance as claimed in claim 5, wherein said control device includes mechanism for placing said appliance in a text/information retrieval mode, said mechanism enabling display of alphabetic characters, whereby said bezel-based input mechanism is manipulated to select an alphabetic character, and activated to display previously entered information associated with that selected character.

11. The wearable appliance as claimed in claim 6, wherein one of said applications including an appointment book application for entering and storing dates and times pertaining to events relevant to a user, said bezel-based input mechanism enabling browsing of appointments names included in said appointment book by positioning an icon on the bezel ring at an hourly position and activating said bezel-based input mechanism to initiate a detailed display of all the events pertaining to that selected hourly interval.

12. The wearable appliance as claimed in claim 11, wherein said bezel-based input mechanism may be subsequently turned to position said icon at a subsequent hour position to initiate displays of events for a subsequent hourly interval.

13. The wearable appliance as claimed in claim 1, wherein said bezel-based input mechanism further comprises a gasket device surrounding said bezel-based input mechanism input and responsive to user interaction for activating an application or selecting and entering displayed items via said user interface.

14. The wearable appliance as claimed in claim 5, wherein said control device includes mechanism for placing said appliance in a zoom mode by selection of a zoom mode graphic item, whereby rotation of the bezel ring in a first direction effects an increase in size of characters being displayed, while rotation of the bezel ring in a second direction effects a decrease in size of characters being displayed.

15. A method for controlling user interface functions in a wearable appliance including a high-resolution display for displaying text and graphic items and a bezel-based input device having a bezel ring capable of being rotated and activated for executing user interface functions, said method comprising the steps of:
    generating display of said user interface functions via said display and initiating display of a cursor navigation element thereof;
    generating signals in response to rotation of said bezel ring for navigating said cursor through displayed graphic and text items;
    generating a signal in response to activation of said bezel-based input mechanism for selecting a displayed graphic and text item highlighted by said cursor; and,
    receiving said signals and effecting navigation, selection and entry of displayed items through said user interface.

16. The method for controlling user interface functions in a wearable appliance as claimed in claim 15, wherein said navigation includes scrolling of displayed content through regions of said display in response to received signals.

17. The method for controlling user interface functions in a wearable appliance as claimed in claim 15, wherein said navigation includes scrolling through a long page of displayed text that does not fit within an interface display area in response to received signals.

18. The method for controlling user interface functions in a wearable appliance as claimed in claim 15, wherein said step of generating signals in response to rotation of said bezel ring includes generating signals representing direction of said bezel rotation.

19. The method for controlling user interface functions in a wearable appliance as claimed in claim 15, wherein said displayed items include icons representing applications for execution in said appliance.

20. The method for controlling user interface functions in a wearable appliance as claimed in claim 19, wherein said bezel ring includes: one or more fixed icons corresponding to applications capable of being executed in said appliance, said method further including the step of: receiving signals for aligning a fixed icon with a predetermined position and activating said aligned fixed icon of said selected application for launching said application.

21. The method for controlling user interface functions in a wearable appliance as claimed in claim 19, wherein said bezel ring includes: a display mechanism for presenting one or more graphic icons corresponding to applications capable of being executed in said appliance, said method further including the step of: initiating display of said one or more graphic icons in said bezel ring display according to an application selected in said user interface display.

22. The method for controlling user interface functions in a wearable appliance as claimed in claim 19, wherein said appliance is placed in a text/character entry mode, said method including:
    receiving signals for initiating display of text and characters to be entered while in said text/character entry mode; and,
    receiving signals related to bezel-based device selection of a desired text/character to be entered and activation of said bezel-based device for entering the desired highlighted text/character.

23. The method for controlling user interface functions in a wearable appliance as claimed in claim 22, wherein when in said text/character entry mode, the step of automatically placing said appliance in a mode for receiving a next text/character to be input after a first character is entered.

24. The method for controlling user interface functions in a wearable appliance as claimed in claim 19, wherein said appliance is placed in a text/information retrieval mode, said method including:
    initiating display of alphabetic characters; and,
    receiving signals related to bezel-based device selection of an alphabetic character, and activating said bezel-based device for displaying previously entered information associated with that selected character.

25. The method for controlling user interface functions in a wearable appliance as claimed in claim 20, wherein said displayed items include icons representing applications for execution in said appliance, one of said applications including an appointment book application for entering and storing dates and times pertaining to events relevant to a user and browsing of appointment names included in said appointment book, said method including the steps of:
    positioning an icon on the bezel ring at an hourly position; and,
    activating said bezel-based input mechanism for initiating a detailed display of all the events pertaining to that selected hourly interval.

26. The method for controlling user interface functions in a wearable appliance as claimed in claim 25, further including the step of: initiating display of events for a subsequent hourly interval in response to receipt of signals placing said icon at a subsequent hour position.

27. The method for controlling user interface functions in a wearable appliance as claimed in claim 19, wherein said bezel-based input further comprises a gasket device surrounding said bezel-based input mechanism, said method including:
    generating signals in response to user interaction with said gasket device input; and
    activating an application or selecting and entering displayed items via said user interface in response to said generating.

28. The method for controlling user interface functions in a wearable appliance as claimed in claim 26, wherein said appliance is placed in a zoom mode, said method including:
    increasing a size of characters being displayed in response to rotation of the bezel-based input device in a first direction; and,
    decreasing a size of characters being displayed in response to rotation of the bezel-based input device in a second direction.

29. A program storage device readable by a machine, tangibly embodying a program of instructions executable by the machine to perform method steps for controlling user interface functions in a wearable appliance including a high-resolution display for displaying text and graphic items and a bezel-based input device having a bezel ring capable of being rotated and activated for executing user interface functions, said method steps including the steps of:
    generating display of said user interface functions via said display and initiating display of a cursor navigation element thereof;
    generating signals in response to rotation of said bezel ring for navigating said cursor through displayed graphic and text items;
    generating a signal in response to activation of said bezel-based input mechanism for selecting a displayed graphic and text item highlighted by said cursor; and,
    receiving said signals and effecting navigation, selection and entry of displayed items through said user interface.

30. The program storage device readable by a machine as claimed in claim 29, wherein said navigation includes scrolling of displayed content through regions of said display in response to received signals.

31. The program storage device readable by a machine as claimed in claim 29, wherein said navigation includes scrolling through a long page of displayed text that does not fit within an interface display area in response to received signals.

32. The program storage device readable by a machine as claimed in claim 29, wherein said step of generating signals in response to rotation of said bezel ring includes generating signals representing direction of said bezel rotation.

33. The program storage device readable by a machine as claimed in claim 29, wherein said displayed items include icons representing applications for execution in said appliance.

34. The program storage device readable by a machine as claimed in claim 33, wherein said bezel ring includes: one or more fixed icons corresponding to applications capable of being executed in said appliance, said method further including the step of: receiving signals for aligning a fixed icon with a predetermined position and activating said aligned fixed icon of said selected application for launching said application.

35. The program storage device readable by a machine as claimed in claim 33, wherein said bezel ring includes: a display mechanism for presenting one or more graphic icons corresponding to applications capable of being executed in said appliance, said method further including the step of: initiating display of said one or more graphic icons in said bezel ring display according to an application selected in said user interface display.

36. The program storage device readable by a machine as claimed in claim 33, wherein said appliance is placed in a text/character entry mode, said method including:

receiving signals for initiating display of text and characters to be entered while in said text/character entry mode; and, receiving signals related to bezel-based device selection of a desired text/character to be entered and activation of said bezel-based device for entering the desired highlighted text/character.

37. The program storage device readable by a machine as claimed in claim 36, wherein when in said text/character entry mode, the step of automatically placing said appliance in a mode for receiving a next text/character to be input after a first character is entered.

38. The program storage device readable by a machine as claimed in claim 33, wherein said appliance is placed in a text/information retrieval mode, said method including:

initiating display of alphabetic characters; and, receiving signals related to bezel-based device selection of an alphabetic character, and activating said bezel-based device for displaying previously entered information associated with that selected character.

39. The program storage device readable by a machine as claimed in claim 34, wherein said displayed items include icons representing applications for execution in said appliance, one of said applications including an appointment book application for entering and storing dates and times pertaining to events relevant to a user and browsing of appointment names included in said appointment book, said method including the steps of:

positioning an icon on the bezel ring at an hourly position; and, activating said bezel-based input mechanism for initiating a detailed display of all the events pertaining to that selected hourly interval.

40. The program storage device readable by a machine as claimed in claim 39, wherein said bezel-based input device includes one or more icons at pre-defined positions, said step of receiving signals related to navigating signals for enabling browsing of appointment names further includes:

activating said bezel-based input device when an icon is at a desired hourly position; and, initiating a detailed display of all the events pertaining to an interval of time associated with said selected hourly position.

41. The program storage device readable by a machine as claimed in claim 40, further including the step of: initiating display of events for a subsequent hourly interval in response to receipt of signals placing said icon at a subsequent hour position.

42. The program storage device readable by a machine as claimed in claim 40, wherein said appliance is placed in a zoom mode, said method including:

increasing a size of characters being displayed in response to rotation of the bezel-based input device in a first direction; and, decreasing a size of characters being displayed in response to rotation of the bezel-based input device in a second direction.

* * * * *